United States Patent [19]

Kumakawa

[11] Patent Number: 5,425,138
[45] Date of Patent: Jun. 13, 1995

[54] APPARATUS AND METHOD FOR AUTOMATICALLY EDITING DOCUMENTS INCLUDING TEXT DATA AND TABLE DATA WITH RULED LINES

[75] Inventor: Yoshio Kumakawa, Oome, Japan

[73] Assignee: Casio Computer Co., Ltd., Tokyo, Japan

[21] Appl. No.: 992,867

[22] Filed: Dec. 17, 1992

[30] Foreign Application Priority Data

Dec. 26, 1991 [JP] Japan .................................. 3-356726
Aug. 31, 1992 [JP] Japan .................................. 4-253485

[51] Int. Cl.⁶ .................................. G06F 17/25
[52] U.S. Cl. .................................. 395/148; 395/146
[58] Field of Search .................................. 395/144–149; 364/419.1, 419.17, 419.19

[56] References Cited

U.S. PATENT DOCUMENTS

| | | | |
|---|---|---|---|
| 4,447,888 | 5/1984 | Kuecker et al. | 395/148 |
| 4,539,653 | 9/1985 | Bartlett et al. | 395/148 |
| 4,575,813 | 3/1986 | Bartlett et al. | 395/147 |
| 4,608,664 | 8/1986 | Bartlett et al. | 395/275 |
| 4,837,729 | 6/1989 | Funahashi | 395/275 |
| 4,891,771 | 1/1990 | Edel et al. | 395/148 |
| 4,953,108 | 8/1990 | Kato et al. | 395/147 |
| 4,963,042 | 10/1990 | Kawakami et al. | 400/17 |

*Primary Examiner*—Heather R. Herndon
*Assistant Examiner*—Joseph R. Burwell
*Attorney, Agent, or Firm*—Frishauf, Holtz, Goodman & Woodward

[57] ABSTRACT

An apparatus of this invention is designed to output document data including ruled line data upon proportionally arranging the data on one page to prevent the disruption of the relationship between the column and row positions of the ruled line data on the page. A document arranging section sequentially changes the character sizes stored in text and table format memories to develop document data of a designated page in a layout development memory. If the developed document data occupies ¾ or more of a printable region, the data is printed according to the current format by a printing section. If the character size exceeds a limit value set in a format table before the area of the data becomes ¾ or more of the printable region, the line spacing and the upper margin are sequentially changed in the same manner. If a ruled line causes overflow when the character size of ruled line data is changed, the character size is decreased by one step to prevent line feed of the ruled line.

9 Claims, 10 Drawing Sheets

| UPPER MARGIN (mm) | 20 | 30 | 50 | 80 |
|---|---|---|---|---|
| CHARACTER SIZE | 8p | 10p | 16p | 20p |
| CHARACTER SPACING | 8/8 | 10/8 | 12/8 | 16/8 |
| LINE SPACING | 8/8 | 12/8 | 16/8 | 20/8 |
| MAXIMUM PAPER WIDTH | A4 | ×××mm | | |
| | B4 | ×××mm | | |
| MAXIMUM PAPER LENGTH | A4 | ×××mm | | |
| | B4 | ×××mm | | |

UNIT : POINT $\begin{pmatrix} 8p=2.811mm \\ 10p=3.514mm \\ 16p=5.622mm \\ 20p=7.028mm \end{pmatrix}$

APPARATUS AND METHOD FOR AUTOMATICALLY EDITING DOCUMENTS INCLUDING TEXT DATA AND TABLE DATA WITH RULED LINES

BACKGROUND OF THE INVENTION

1. Field of the Invention

The present invention relates to a document data output apparatus for outputting document data including text data constituted by characters, numeric values, and the like, and ruled line data.

2. Description of the Related Art

A wordprocessor and an office computer can generate document data including text data consisting of characters, numeric values, and the like, and ruled line data. The generated document data is printed out on predetermined paper sheets in units of pages. In this case, the positions of the respective data of the document data arranged on the paper sheets are determined by a printing format for the document data, i.e., information such as paper size, character size, character spacing, and line spacing.

Since the printing format is arbitrarily set by an operator, the set format may be inappropriate for corresponding document data. That is, if the character size, the character spacing, and the line spacing are small relative to the total data amount of document data, the overall document data may be disproportionally arranged on an upper portion of a paper sheet to which the data is output, resulting in an unbalanced printout.

In this case, in a conventional apparatus, the operator must repeatedly change the printing format until the document data is proportionally arranged on one page.

In such a printing format changing operation, problems are posed especially in a case wherein the document data includes not only text data but also ruled line data. The ruled line data is input to form a table enclosed within ruled lines on a document. The physical column and row positions of lines including such ruled line data on a paper sheet must not be shifted when the printing format is changed.

Figure 10:
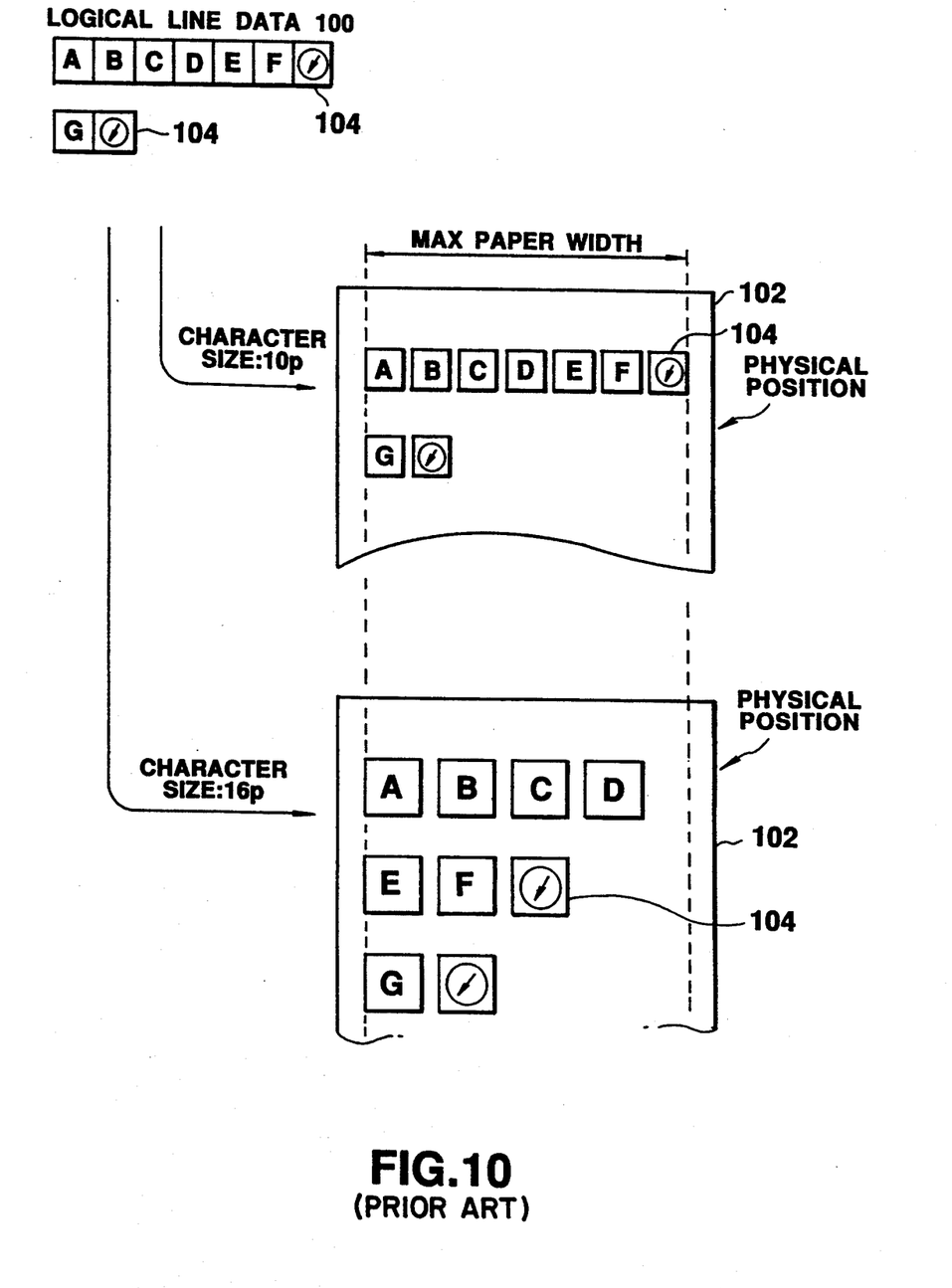
FIG. 10 is a view showing changes in physical position with a change in character size.

FIG. 10 shows a case wherein when document data as logical data is to be actually printed on a paper sheet, the physical output position of each data of the document data on the paper sheet, i.e., the relationship between the column and row positions on one page, is completely changed depending on the column and row pitches determined by the character size, the character spacing, and the line spacing designated by the currently set printing format.

In this case, one line of logical line data 100 stored in a document memory (not shown) does not correspond to one line on an actual paper sheet 102 but corresponds to one line delimited by a line feed code 104. In addition, the arrangement pitch (the pitch between a given character/line and the next character/line) of the characters on the paper sheet 102 is changed with a change in character size. More specifically, the number of lines by which one logical line is printed on the actual paper sheet 102 is determined by the maximum (MAX) width of the paper sheet 102 and the character size and character spacing of format data. This number of lines is determined as follows: the number of characters of one physical line=MAX paper width/(character size×character spacing); and the number of physical lines with respect to one logical line=the number of characters of logical line data/the number of characters of one physical line.

If a printing format, e.g., a character size, is changed in this manner, proper line feed of text data is performed to prevent the data from partially overflowing from the paper sheet 102 so as not to be printed out. With regard to ruled line data, however, since line feed cannot be performed, part of the data may overflow from the paper sheet 102 so as not be printed out, or line feed may be forcibly performed to cause wraparound to thereby destroy the form of a table.

SUMMARY OF THE INVENTION

It is an object of the present invention to output document data including fixed data such as ruled line data by proportionally arranging the data on one page without causing wraparound and without destroying the relationship between the column and row positions of the fixed data on the page.

In order to achieve the above object, according to the present invention, there is provided a document data output apparatus for outputting document data including text data constituted by, e.g., character and numeric data, and fixed data, e.g., ruled line data, comprising: (A) storage means for storing a first arrangement pitch of the document data assigned to one page; (B) identifying means for identifying a text region constituted by lines including no fixed data and a fixed line region constituted by lines including fixed data in the document data assigned to the page; (C) first changing means for changing the first arrangement pitch, stored in the storage means, to a second arrangement pitch so as to increase an arrangement pitch of each data in the text region; (D) second changing means for changing the first arrangement pitch, stored in the storage means, to a third arrangement pitch so as to increase an arrangement pitch of each data in the fixed line region within a range in which each data in the fixed line region is not fed to a next line; and (E) output means for arranging the data in the text region at the second arrangement pitch and outputting the arranged data, and arranging the data in the fixed line region at the third arrangement pitch and outputting the arranged data.

According to the present invention, therefore, document data including fixed data such as ruled line data can be output after the data is proportionally arranged on one page without destroying the relationship between the column and row positions of the fixed data on the page.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An embodiment of the present invention will be described below with reference to FIGS. 1 to 9D.

Figure 1:
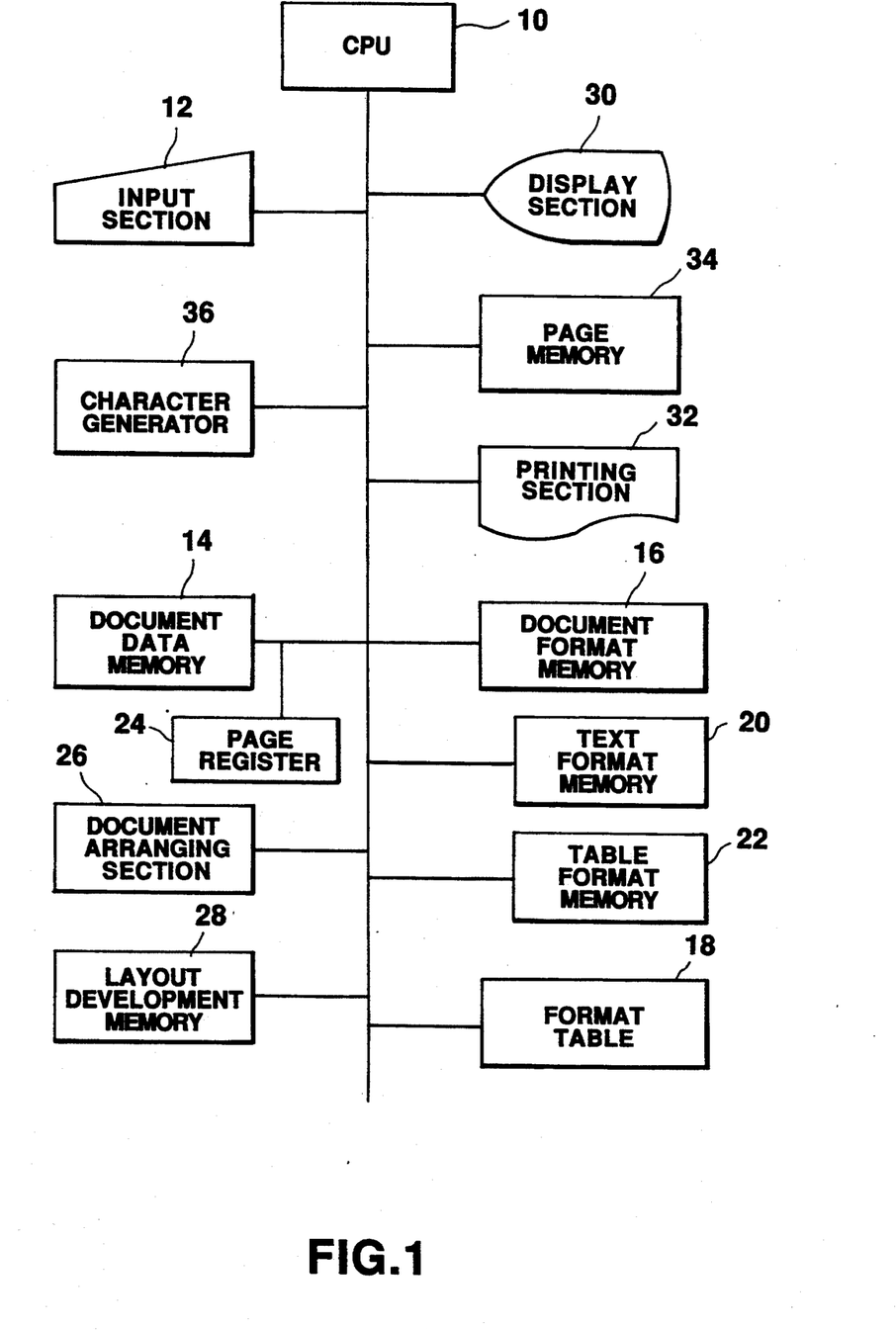
FIG. 1 is a block diagram showing the arrangement of a document data processing apparatus.

FIG. 1 is a block diagram showing the arrangement of the embodiment. Referring to FIG. 1, reference numeral 10 denotes a CPU for performing overall control of the apparatus; 12, an input section for inputting document data including text data constituted by characters, numeric values, and the like, and ruled line data, and designating an output page; and 14, a document data memory for storing input document data.

Figure 2A:
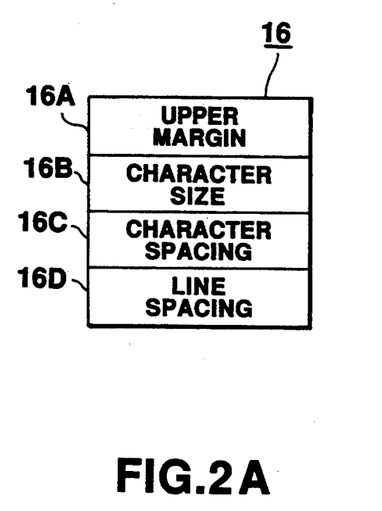
FIG. 2A is a view showing the stored contents of a document format memory.
Figure 2B:
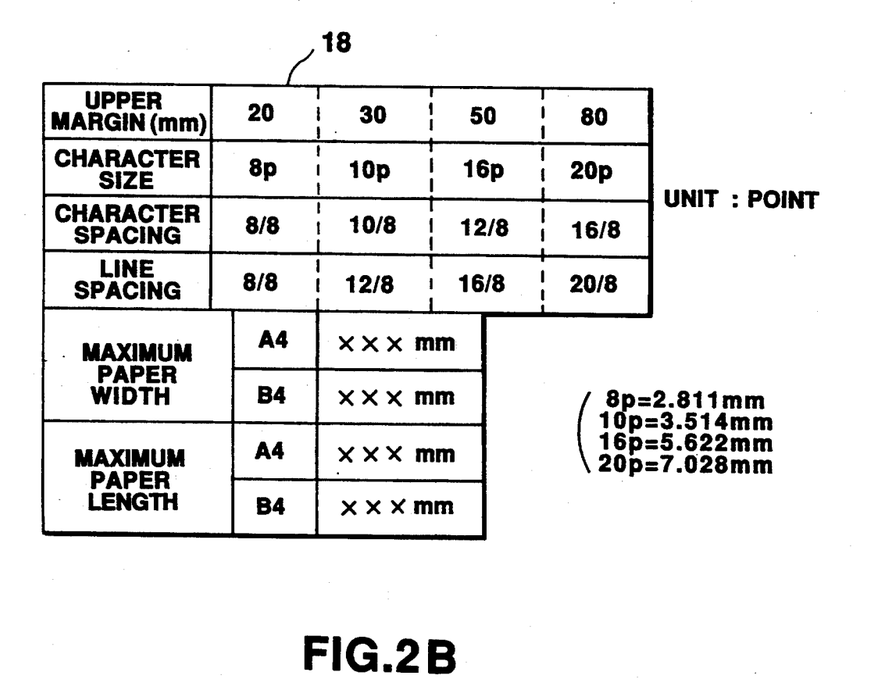
FIG. 2B is a view showing the stored contents of a format table.

Reference numeral 16 denotes a document format memory for storing document format data including an upper margin 16A, a character size 16B, a character spacing 16C, and a line spacing 16D, as shown in FIG. 2A; 18, a format table for storing the limit values of the respective pieces of set information of document format data, as shown in FIG. 2B; 20, a text format memory for storing document format data associated with a text region to which text data is output; and 22, a table format memory for storing document format data associated with a fixed line region to which ruled line data is output. The text format memory 20 and the table format memory 22 store the respective document format data, i.e., upper margins, character sizes, character spacings, and line spacings, similar to the document format memory 16.

Reference numeral 24 denotes a page value storage section for storing page value information indicating a specific page designated through the input section 12; 26, a document arranging section for arranging the contents of the text format memory 20 and the table format memory 22 within the ranges of the limit values stored in the format table 18; and 28, a layout development memory which has a capacity corresponding to one page and is designed to develop data, of document data stored in the document data memory 14, which corresponds to a page indicated by page value information stored in the page value storage section 24, in accordance with a format indicated by the contents of the text format memory 20 and the table format memory 22. The document arranging section 26 determines the balance of document data in one page by referring to a layout developed in the layout development memory 28.

Reference numeral 30 denotes a display section such as a CRT; 32, a printing section such as a printer; 34, a page memory in which data output to the display section 30 or the printing section 32 is written, which data is output in units of pages in accordance with document format data stored in the document format memory 16 or data stored in the text format memory 20 and the table format memory 22; and 36, a character generator for converting text data (character codes), stored in the document data memory 14, into characters and writing them in the page memory 34.

Figure 3A:
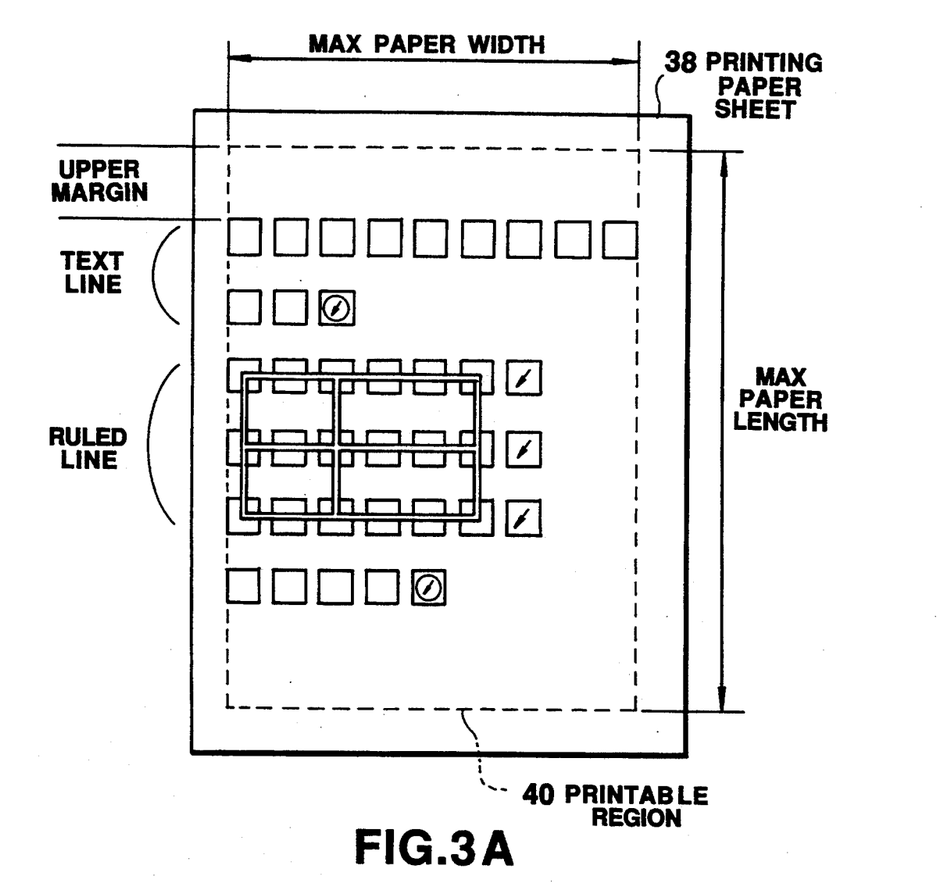
FIG. 3A is a view for explaining a printing paper sheet.

The upper margin 16A stored in the document format memory 16 as shown in FIG. 2A is information indicating the size of a margin from the upper end of a printable region 40 of a printing paper sheet 38, as shown in FIG. 3A. The unit of margins is in millimeters. The character size 16B is expressed by points. The character spacing 16C and the line spacing 16D are expressed by numbers with a reference character size set as "1". That is, the character size 16B and the character spacing 16C (line spacing 16D) have the relationship shown in FIGS. 4A and 4B.

The limit values of character and line spacings with respect to character sizes are stored in the format table 18 in correspondence with the limit values of upper margins, as shown in FIG. 2B. In addition, the maximum (MAX) width and the MAX length of the printing paper sheet 38 are stored in the format table 18. These MAX width and length correspond to the size of the printable region 40, as shown in FIG. 3A.

Figure 3B:
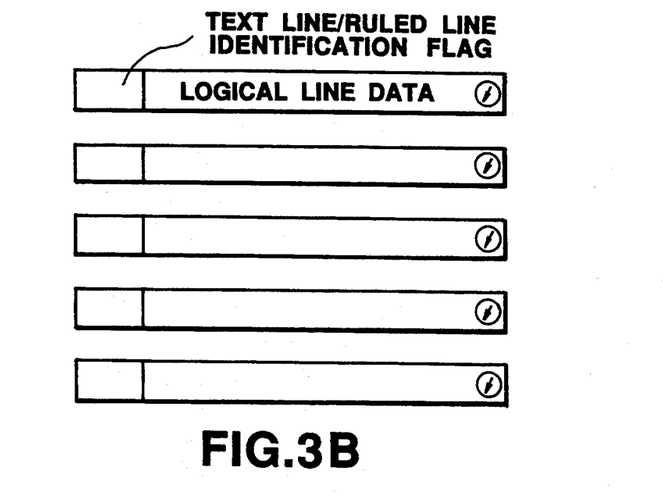
FIG. 3B is a view for explaining logical line data.
Figure 4A:
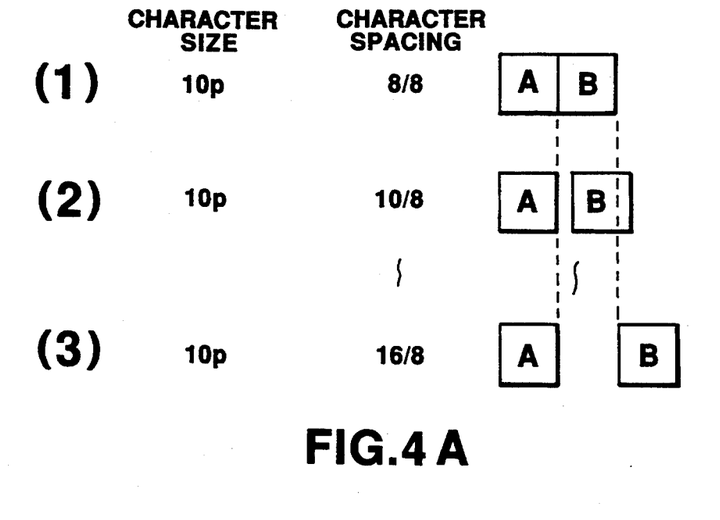
FIGS. 4A and 4B are views for explaining character size and character spacing.
Figure 4B:
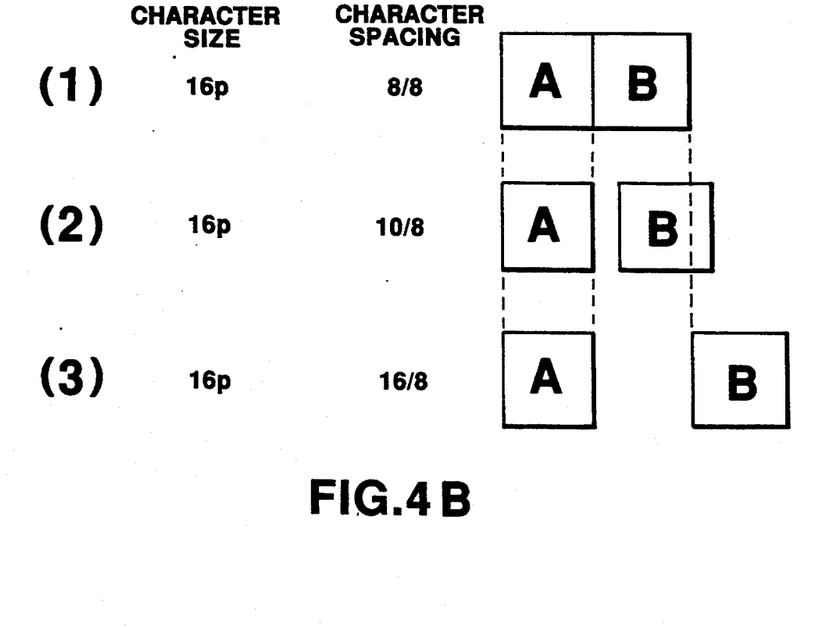

Document data is stored in the document data memory 14 in such a manner that an identification flag is appended to the head of each of logical lines separated in units of line feed codes to identify the line as a text line or a ruled line, as shown in FIG. 3B.

An operation of the apparatus having the above-described arrangement will be described next.

Figure 5:
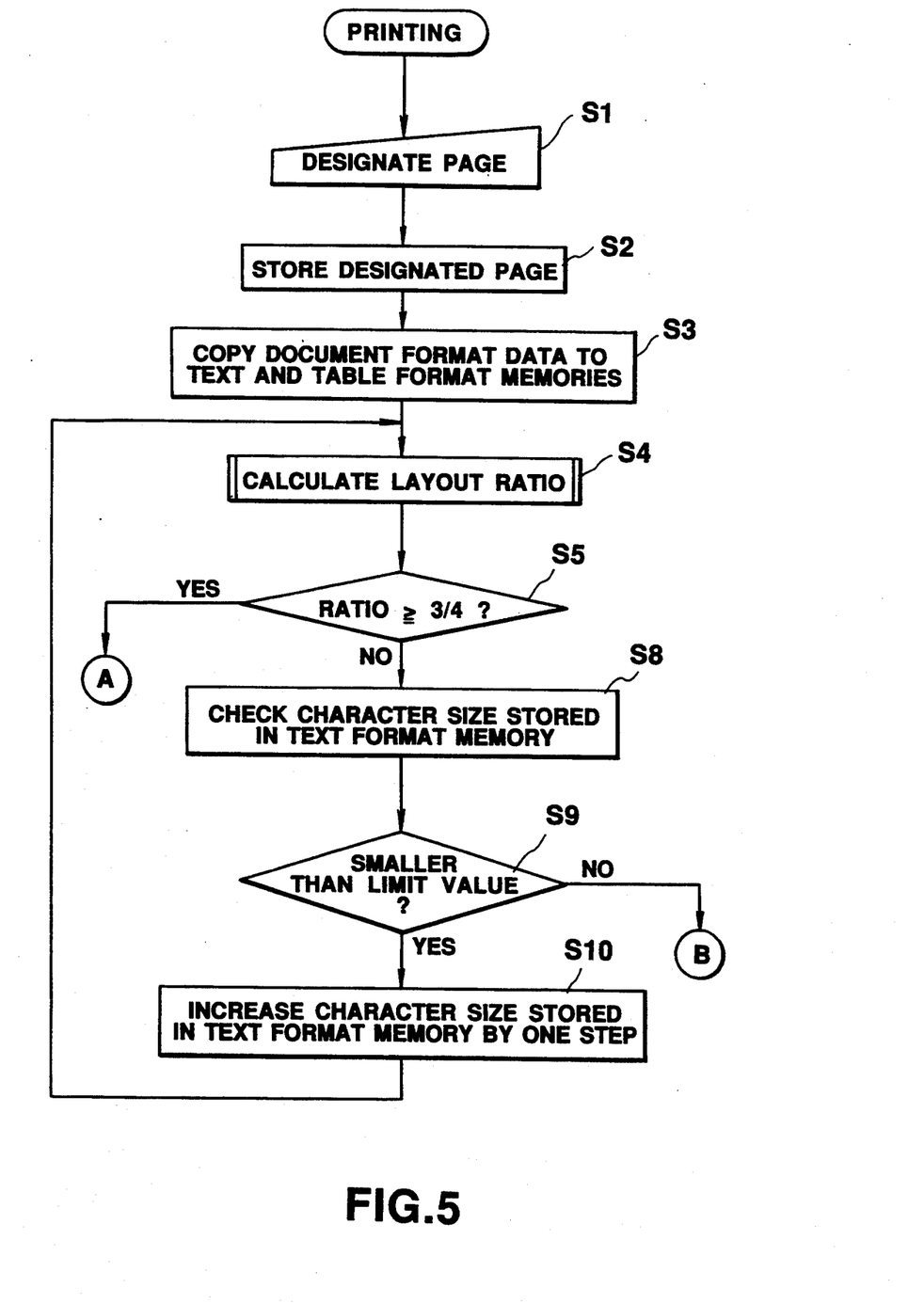
FIG. 5 is a flow chart showing a first portion of a printing operation.
Figure 6:
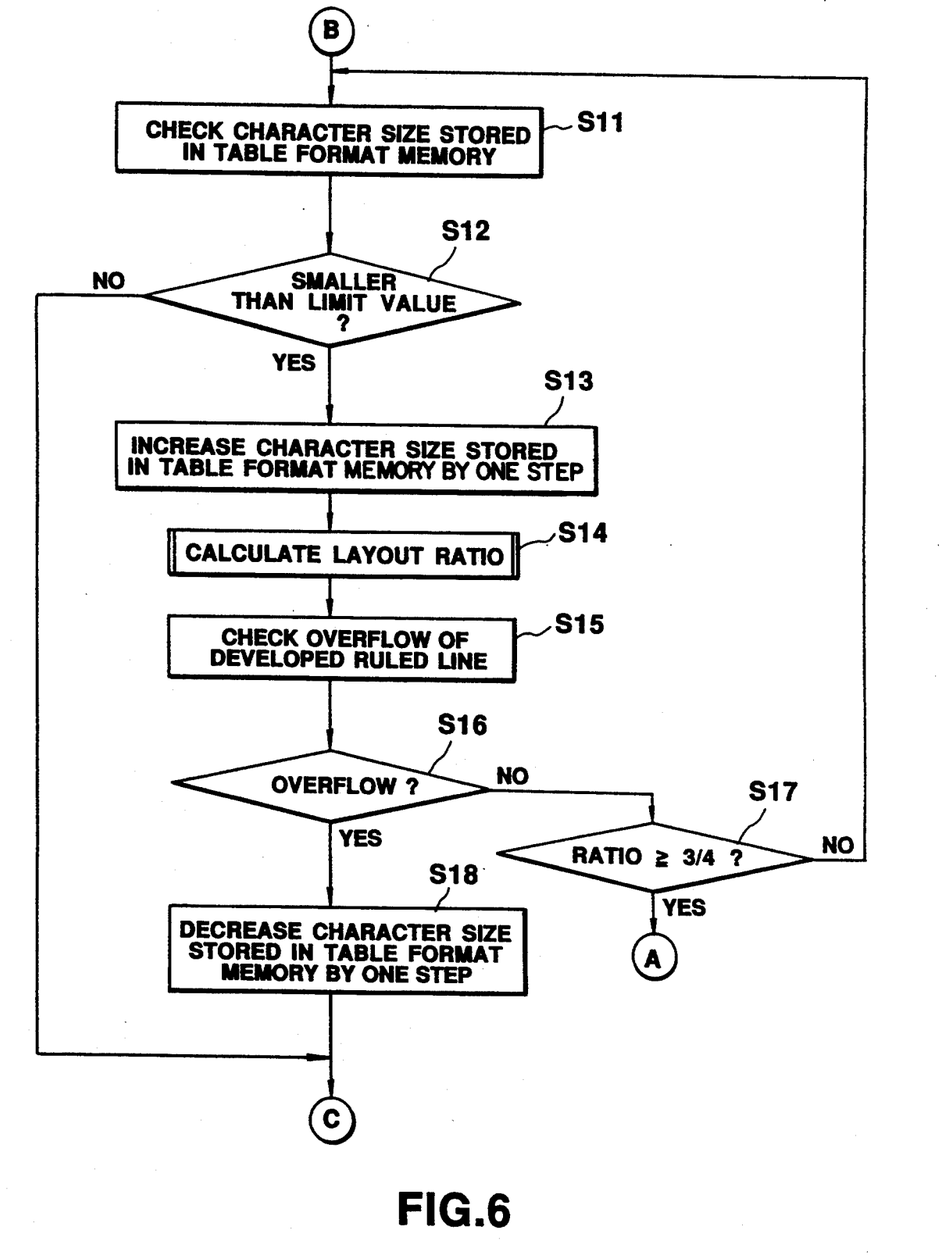
FIG. 6 is a flow chart showing an intermediate portion of the printing operation.
Figure 7:
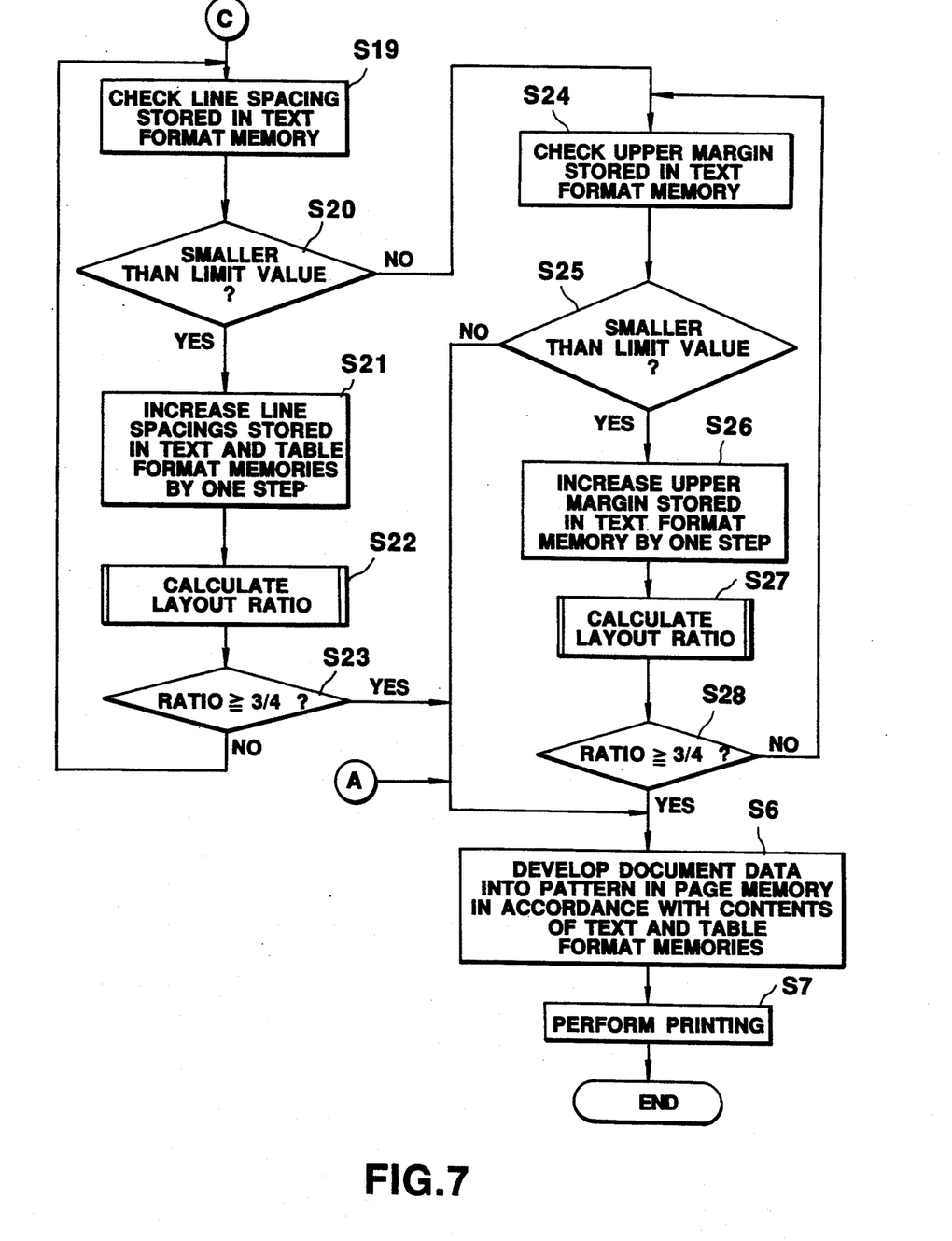
FIG. 7 is a flow chart showing a last portion of the printing operation.

FIGS. 5 through 7 are flow charts showing a printing operation.

When printing of a given page by means of the printing section 32 is designated through the input section 12 while document data consisting of text data and ruled line data is stored in the document data memory 14 (step S1), the document arranging section 26 stores the page value of the designated page in the page value storage section 24 (step S2). Document format data stored in the document format memory 16 is copied to the text format memory 20 and the table format memory 22 (step S3).

Figure 2C:
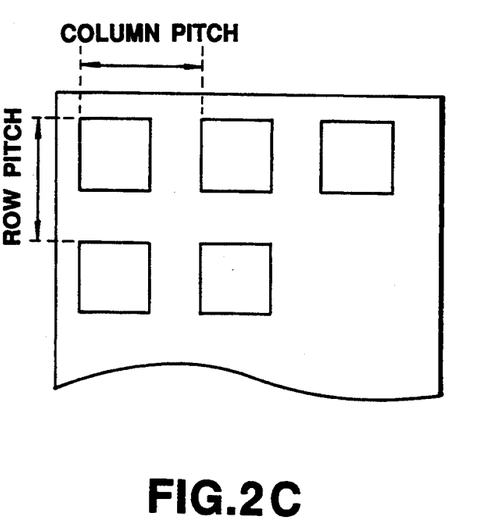
FIG. 2C is a view for explaining column pitch and row pitch.
Figure 8:
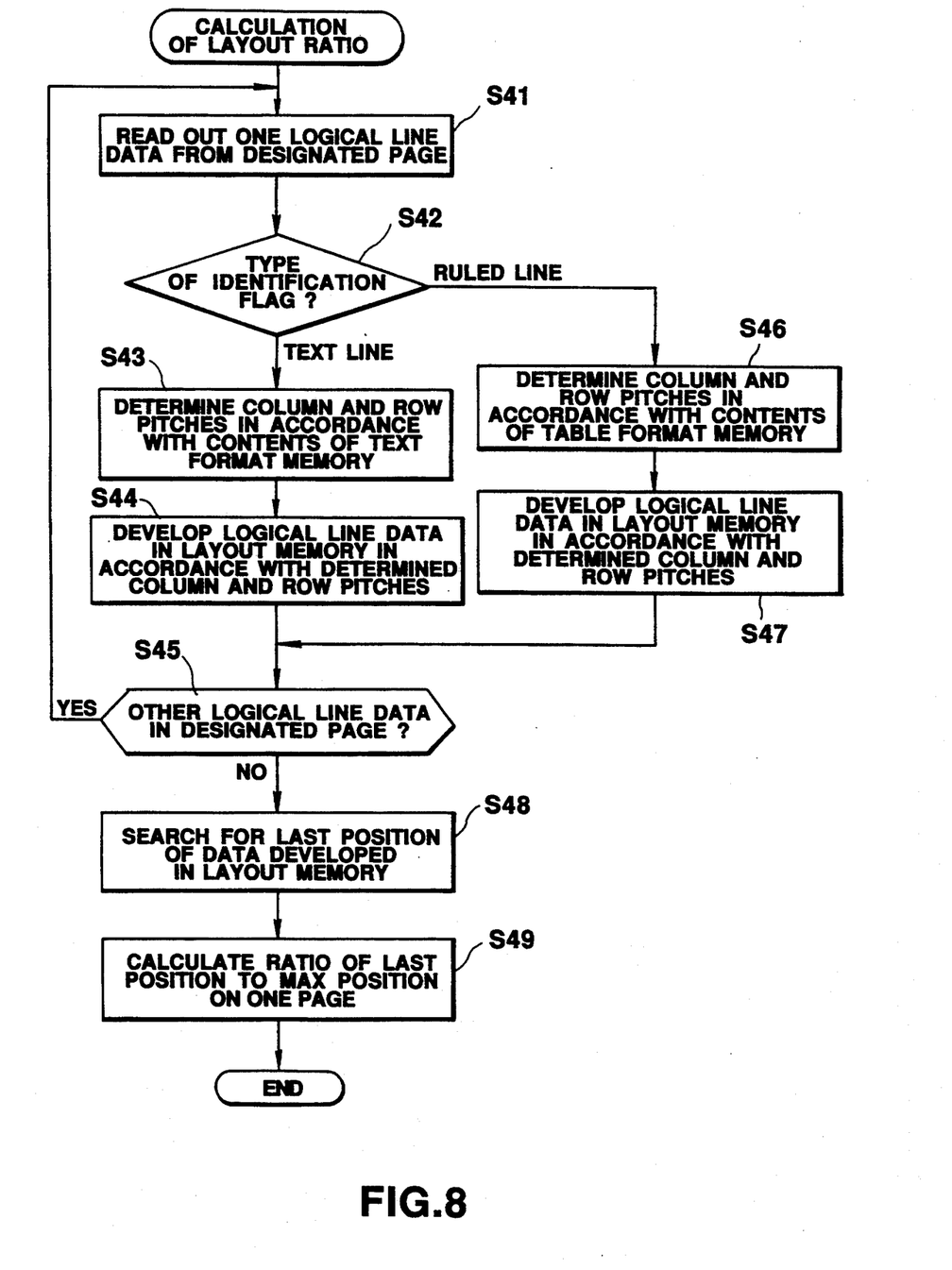
FIG. 8 is a flow chart showing a routine for calculating a layout ratio.

Subsequently, a layout ratio calculation routine is called to calculate a layout ratio. The layout ratio calculation routine is performed, as shown in FIG. 8. More specifically, one logical line data of the designated page is read out from the document data memory 14 in accordance with the designated page value stored in the page value storage section 24 (step S41). The identification flag appended to the head of the logical line data is checked (step S42). If the flag indicates a text line, a column pitch and a row pitch are determined on the basis of the contents of the text format memory 20 (step S43). In this case, column and row pitches each indicate the distance from the head coordinate value of a given character to the head coordinate value of the next character. That is, the column pitch can be determined by "character size × character spacing"; and the row pitch, "character size × line spacing", as shown in FIG. 2C.

The logical line data is developed in the layout development memory 28 on the basis of the column and row pitches determined in this manner (step S44). If other logical line data remains in the designated page (step S45), the flow returns to step S41 to process the next logical line data.

If it is determined from the identification flag in step S42 that the logical line is a ruled line, column and row pitches are determined on the basis of the contents of the table format memory 22 (step S46). The logical line data is then developed in the layout development data 28 in accordance with the determined column and row pitches (step S47). If other logical line data remains in the designated page (step S45), the flow returns to step S41 to process the next logical data.

When development of all the logical line data in the designated page is completed in this manner, the last position of the data developed in the layout development memory 28 is searched (step S48). The ratio of the searched last position to the maximum (MAX) position (MAX paper length) in one page is calculated, and the flow returns to the main routine.

It is checked whether the ratio calculated by this layout ratio calculation routine is equal to or higher than $\frac{3}{4}$ (step S5). If YES in step S5, it is considered that the document data is proportionally arranged on one page. As a result, the document data of the page, stored in the document data memory 14, is developed into a pattern in the page memory 34 by the character generator 36 in accordance with the contents of the text format memory 20 and the table format memory 22 (step S6), and the resultant data is printed by the printing section 32 (step S7).

Figure 9A:
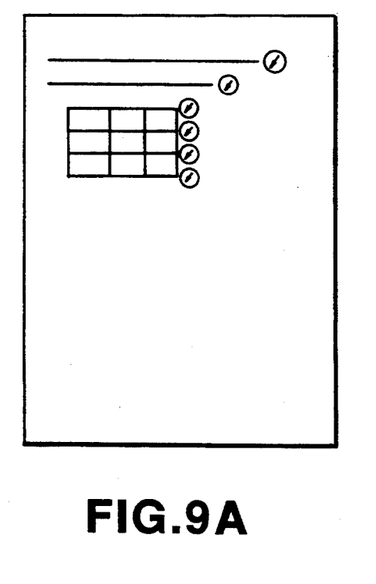
FIGS. 9A through 9D are views showing changes in layout.
Figure 9B:
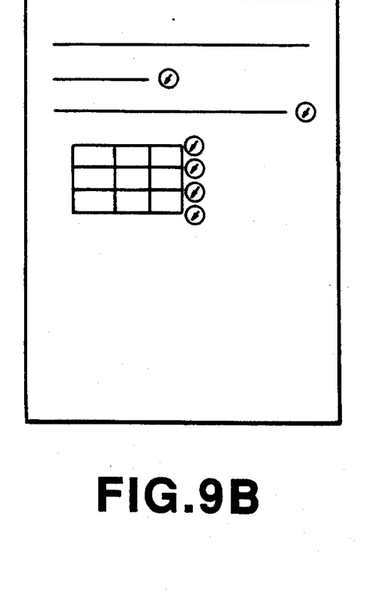

If it is determined in step S5 that the ratio is less than $\frac{3}{4}$, e.g., as in the case shown in FIG. 9A, the character size stored in the text format memory 20 is checked (step S8). It is then checked whether the character size is smaller than the corresponding limit value stored in the format table 18 (step S9). If YES in step S9, the character size stored in the text format memory 20 is increased by one step (step S10). The flow returns to step S4 to calculate a layout ratio with respect to the updated character size. With the loop from step S4 through step S10, as shown in FIG. 9B, the character size of the text data is gradually increased, and the row and column pitches of the text lines are increased (the number of physical lines may be increased) while the ruled line data, i.e., the table, remains the same.

Figure 9C:
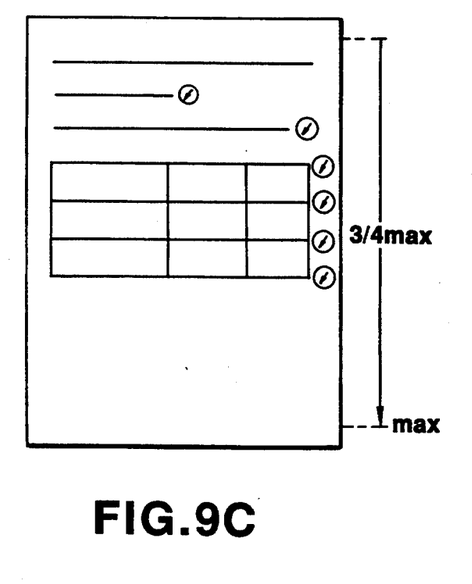

Assume that only a ratio less than $\frac{3}{4}$ can be obtained even after the character size of the text lines reaches its limit value. In this case, the character size stored in the table format memory 22 is checked (step S11) to check whether it is smaller than the limit value stored in the format table 18 (step S12). If the character size exceeds the limit value, the flow advances to step S19 (to be described later). If the character size is smaller than the limit value, the character size stored in the table format memory 22 is increased by one step (step S13). With this operation, as shown in FIG. 9C, the column and row pitches of the ruled lines are increased, and hence the ruled lines are expanded in the lateral and longitudinal directions. After the increase in character size, a layout ratio calculation routine is called (step S14). The layout ratio calculation routine in step S14 is the same as that in step S4.

After a layout ratio is calculated, it is checked whether each ruled line developed in the layout development memory 28 overflows, i.e., line feed occurs (step S15). If no ruled line overflows (step S16), it is checked whether the calculated ratio is equal to or higher than $\frac{3}{4}$ (step S17). If YES in step S17, it is considered that the document data is proportionally arranged on one page. Therefore, the flow advances to steps S6 and S7 to print the data.

If it is determined that the ratio is less than $\frac{3}{4}$, the flow returns to step S11 to repeat the above-described processing.

If it is determined in step S16 that the developed ruled lines overflow, the character size stored in the table format memory 22 is decreased by one step to prevent a line feed operation (wraparound) of the ruled lines (step S18).

Figure 9D:
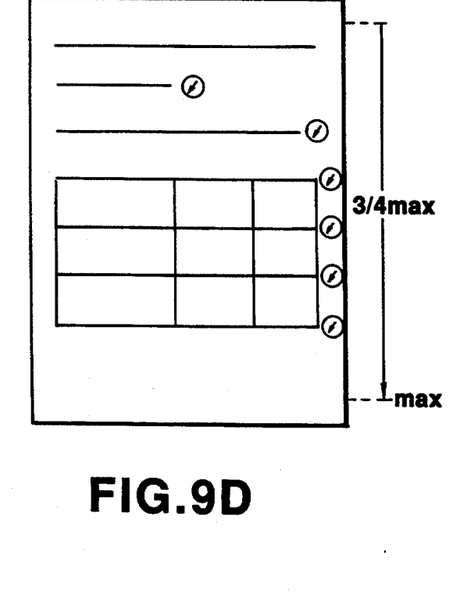

Assume that the ratio does not reach $\frac{3}{4}$ even after the character sizes of both the text lines and the ruled lines reach their limit values. In this case, the line spacing stored in the text format memory 20 is checked (step S19) to check whether it is smaller than the corresponding limit value stored in the format table 18 (step S20). If YES in step S20, the line spacings stored in the text format memory 20 and the table format memory 22 are increased by one step (step S21). With this operation, for example, as shown in FIG. 9D, the line spacings of the text lines and the ruled lines are increased in the longitudinal direction in one page. After the increases in line spacing, a layout ratio calculation routine is called (step S22). The layout ratio calculation routine in step S22 is also the same as that in step S4. It is then checked whether the calculated layout ratio is equal to or higher than $\frac{3}{4}$ (step S23). If YES in step S23, it is considered that the document data is proportionally arranged on one page, and the flow advances to steps S6 and S7 to print the data.

If it is determined that the ratio is less than $\frac{3}{4}$, the flow returns to step S19 to repeat the above-described processing.

If the line spacing is increased, and it is determined in step S20 that the line spacing exceeds the limit value, the upper margin stored in the text format memory 20 is checked (step S24). It is checked whether the upper margin is smaller than the limit value stored in the format table 18 (step S25). If YES in step S25, the upper margin stored in the text format memory 20 is increased by one step (step S26), and a layout ratio calculation routine is called (step S27). The layout ratio calculation routine in step S27 is also the same as that in step S4. It is then checked whether the calculated layout ratio is equal to or higher than $\frac{3}{4}$ (step S28). If YES in step S28, it is considered that the document data is proportionally arranged on one page. Therefore, the flow advances to steps S6 and S7 to print the data.

If it is determined that the ratio is less than $\frac{3}{4}$, the flow returns to step S24 to repeat the above-described processing.

If the upper margin exceeds its limit value in step S25, the format is not changed any more, and the flow advances to steps S6 and S7 to print the data according to the current format.

In this manner, if the character size of text data is sequentially changed, and document data is proportionally arranged, the data is printed according to the current format. If the data is not proportionally arranged, the character size of ruled line data is sequentially changed. If the document data is proportionally arranged upon this operation, printing is performed according to the current format. If the data is not proportionally arranged, the line spacings of both the text and ruled line data are sequentially changed. If the document data is proportionally arranged upon this operation, printing is performed according to the current format. If the data is not proportionally arranged, the upper margin is adjusted. If the document data is proportionally arranged upon this operation, printing is performed according to the current format. Even if the data is not proportionally arranged, since the set values cannot be changed any more, printing is performed on the basis of the limit values of the respective document format data. Therefore, document data including text data and ruled line data can be proportionally arranged on one page and printed out.

In addition, if the character size of ruled line data is changed, overflow of each ruled line is checked. If overflow occurs, the character size is decreased in one step to prevent a line feed operation of each ruled line. Therefore, when document data including ruled line data is to be proportionally arranged on one page and printed out, the disruption of the relationship between the column and row positions of fixed (ruled line) data on one page can be prevented.

Although checking of the upper margin in step S24 and the stepwise upper margin increasing operation in step S26 are performed with respect to the text format memory 20, since this upper margin data is identical to the upper margin data stored in the table format memory 22, the above operations may be performed with respect to the memory 22. Alternatively, if this changing operation is performed by referring to the upper margin 16A stored in the document format memory 16 in step S6, the operations in steps S24 and S26 can be performed with respect to the document format memory 16.

In addition, as the reference ratio for determining whether document data is proportionally arranged, ¾ of the maximum value in the longitudinal direction of the printable region 40, i.e., the MAX paper length, is used. However, the reference ratio is not limited to this value and can be changed, as needed.

It is apparent that various changes and modifications can be made within the spirit and scope of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A document output apparatus for outputting document data which includes text data and fixed data, said text data including, character data and numeric data, and said fixed data, including ruled line data, the document output apparatus comprising:
   storage means for storing data defining a first arrangement pitch of the document data assigned to one page, the data defining the first arrangement pitch including data defining at least one of a pitch of adjacent characters in a row of characters and a spacing between a line and a next line;
   identifying means for identifying at least one of:
      a text region constituted by lines which do not include the fixed data, and
      a fixed line region constituted by lines including fixed data in the document data assigned to the page;
   first changing means for changing the first arrangement pitch, stored in said storage means, to a second arrangement pitch so as to increase an arrangement pitch of each data in the text region;
   second changing means for changing the first arrangement pitch, stored in said storage means, to a third arrangement pitch so as to increase an arrangement pitch of each data in the fixed line region within a range in which each data in each line of the fixed line region does not wraparound to a next line; and
   output means for outputting the data in the text region in accordance with the second arrangement pitch, and for outputting the data in the fixed line region in accordance with the third arrangement pitch.

2. The apparatus according to claim 1, wherein said first and second changing means comprise means for changing an arrangement pitch of each data in units of steps, and wherein said apparatus further comprises:
   first checking means for checking each data of the text region arranged on one page at the second arrangement pitch every time said first changing means changes the pitch by one step to check whether the data is arranged on a page;
   second checking means for checking whether or not each data of the fixed line region is arranged on one page at the third arrangement pitch every time said second changing means changes the pitch by one step; and
   repeating means for repeatedly operating said first or second changing means to repeatedly perform an arrangement pitch changing operation until said first or second checking means determines an arrangement of data on a sheet.

3. An apparatus according to claim 1, wherein the arrangement pitch is a column pitch.

4. An apparatus according to claim 1, wherein the arrangement pitch is a row pitch.

5. A data output control method of controlling document data, the document data including, in a page, text data comprised of a plurality of characters and table data surrounded by ruled lines, the method comprising the computer implemented steps of:
   discriminating, based on row data identification attribute data, a text area comprised of rows not including ruled lines, and a table area comprised of rows including ruled lines, the text area and the table area being both included in a given page of the document;
   setting a first arrangement pitch while sequentially enlarging the text data in a direction in which the arrangement pitch of each character data in the text area is enlarged, said first arrangement pitch including at least data defining a pitch of adjacent characters of the row data;
   setting, independent of setting the first arrangement pitch, a second arrangement pitch while sequentially enlarging the table data in a direction in which the arrangement pitch of each character data in the table area is enlarged and within a range in which a table arrangement of the table data is such that the table arrangement of the table data remains on the given page of the document, said second arrangement pitch including at least data defining a pitch of adjacent characters of character data of the table data; and outputting the document data such that each character data in the text area is arranged at the first arrangement pitch, and the ruled lines surrounding the character data in the table area are output such that each character data in the table area is arranged at the second arrangement pitch.

6. The method according to claim 5, wherein:

when the arrangement pitch in the text area is set to the first arrangement pitch, the arrangement pitch is enlarged by enlarging a size of each character in the text area; and when the arrangement pitch in the table area is set to the second arrangement pitch, the arrangement pitch is enlarged by enlarging a size of each character in the table area.

7. A data output control method of controlling document data, the document data including, in a page, text data comprised of a plurality of characters and table data surrounded by ruled lines, the method comprising the computer implemented steps of:

discriminating, based on row data identification attribute data, a text area comprised of rows not including ruled lines, and a table area comprised of rows including ruled lines, the text area and the table area being both included in a given page of the document;

setting a first arrangement pitch while sequentially enlarging the text data in a direction in which the arrangement pitch of each character data in the text area is enlarged, said first arrangement pitch including at least data defining a pitch of adjacent characters of the row data;

setting, after setting the first arrangement pitch, a second arrangement pitch while sequentially enlarging the table data in a direction in which the arrangement pitch of each character data in the table area is enlarged and within a range in which a table arrangement of the table data is such that the table arrangement of the table data remains on the given page of the document, said second arrangement pitch including at least data defining a pitch of adjacent characters of character data of the table data;

setting, after setting the second arrangement pitch, a blank area in a direction in which a blank area of the text area with respect to one page of the document is enlarged; and outputting the document data such that the blank area set by the blank area setting step is maintained, each character data in the text area is arranged at the first arrangement pitch, and the ruled lines and character data in the table area are output at the second arrangement pitch.

8. A data output control method of controlling document data, the document data including, in a page, text data comprised of a plurality of characters and table data surrounded by ruled lanes, the method comprising the computer implemented steps of:

storing an arrangement pitch of each character data in the text data included in the document as a first arrangement pitch and an arrangement pitch of the table data in the document as a second arrangement pitch, said arrangement pitches including at least data defining a pitch of adjacent character data in a row of data;

setting a third arrangement pitch by correcting the arrangement pitch with respect to one page of the document such that the first arrangement pitch is enlarged;

discriminating the text data and the table data within one page of the document based on data identification attribute data;

calculating a ratio of a first total occupied area to an entire area of said one page, the first total occupied area being a sum of:

an entire occupied area of text data when each character data in the text data, discriminated based on the data identification attribute data, is arranged at the third arrangement pitch, and an entire occupied area of the table data when the table data, discriminated based on the data identification attribute data, is arranged at the second arrangement pitch;

outputting each character data included in the text data at the third arrangement pitch and the table data at the second arrangement pitch when the calculated ratio of the first total occupied area is at least a predetermined value;

setting a fourth arrangement pitch by correcting the second arrangement pitch with respect to the table data to be enlarged within a range that the table arrangement of the table data is such that the table arrangement of the table data remains on the one page of the document, when the ratio of the calculated first total occupied area is less than the predetermined value;

calculating a ratio of a second total occupied area to an entire area of said one page after setting the fourth arrangement pitch, the second total occupied area being a sum of:

an occupied area of entire text data when each character data, included in the text data discriminated based on the data identification attribute data, is arranged at the third arrangement pitch, and an occupied area of the entire table data when the table data, discriminated based on data identification attribute data, is arranged at the fourth arrangement pitch; and outputting each character data included in the text data at the third arrangement pitch and outputting the table data at the fourth arrangement pitch when the calculated ratio of the second total occupied area is at least a predetermined value.

9. The method according to claim 8, further comprising:

outputting each character data included in the text data at the third arrangement pitch and the table data at the fourth arrangement pitch such that a line space or a blank area of the text data and the table data is enlarged when the calculated ratio of the second total occupied area is less than the predetermined value.

* * * * *